(12) United States Patent
Ding et al.

(10) Patent No.: US 11,380,144 B2
(45) Date of Patent: Jul. 5, 2022

(54) VEHICLE RUNNING STATUS FIELD MODEL-BASED INFORMATION TRANSMISSION FREQUENCY OPTIMIZATION METHOD IN INTERNET OF VEHICLES

(71) Applicant: DALIAN UNIVERSITY OF TECHNOLOGY, Liaoning (CN)

(72) Inventors: Nan Ding, Liaoning (CN); Ximing Sun, Liaoning (CN); Di Wu, Liaoning (CN); Weiguo Xia, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 84 days.

(21) Appl. No.: 17/048,362

(22) PCT Filed: Jul. 2, 2020

(86) PCT No.: PCT/CN2020/099938
§ 371 (c)(1),
(2) Date: Oct. 16, 2020

(87) PCT Pub. No.: WO2021/017747
PCT Pub. Date: Feb. 4, 2021

(65) Prior Publication Data
US 2021/0125424 A1 Apr. 29, 2021

(30) Foreign Application Priority Data
Jul. 30, 2019 (CN) .......................... 201910691998.7

(51) Int. Cl.
*G01S 13/58* (2006.01)
*G07C 5/00* (2006.01)
(Continued)

(52) U.S. Cl.
CPC ............ *G07C 5/008* (2013.01); *G01S 13/505* (2013.01); *G01S 13/58* (2013.01); *H04L 61/6022* (2013.01); *H04W 4/40* (2018.02)

(58) Field of Classification Search
CPC ........... G01S 13/58; G07C 5/00; G07C 5/008; H04W 4/40
See application file for complete search history.

(56) References Cited

U.S. PATENT DOCUMENTS

2011/0034201 A1* 2/2011 Hamada .................. H04L 67/12
455/517
2016/0112856 A1 4/2016 Han et al.
(Continued)

FOREIGN PATENT DOCUMENTS

| CN | 108200601 A | 6/2018 |
| CN | 108648447 A | 10/2018 |
| CN | 110505601 A | 11/2019 |

OTHER PUBLICATIONS

Zhuang-Lin Gao; "Study and Design of Multi-LLC Mechanism Based on Convergence of Heterogeneous networks on V ANET"; MLLC; Dalian University of Technology, Feb. 28, 2019; pp. 1-57.
(Continued)

*Primary Examiner* — Tan Q Nguyen
(74) *Attorney, Agent, or Firm* — Muncy, Geissler, Olds & Lowe, P.C.

(57) ABSTRACT

A vehicle running status field model-based information transmission frequency optimization method in the Internet of Vehicles belongs to the technical field of network communications. The method establishes a running status field model according to the real-time running status of a road vehicle to describe the degree of risk of the vehicle, the degree of risk can be used to dynamically adjust the transmission frequency of safety-critical information, and the transmission frequency of non-safety-critical information is adjusted through the real-time transmission frequency of safety-critical information to achieve the purpose of improving the utilization ratio of link. The method establishes the running status field model of a moving vehicle, uses the risk intensity of the vehicle in the running status field to describe the current running risk of the vehicle, and takes account of different application scenarios, thereby having generality. In addition, the improved network resource optimization method can effectively improve the communication effi- (Continued)

ciency of heterogeneous networks, and dynamically adjust the transmission frequency of safety-critical information through the magnitude of the risk intensity to improve the utilization ratio of link.

1 Claim, 3 Drawing Sheets

(51) Int. Cl.
*H04W 4/40* (2018.01)
*G01S 13/50* (2006.01)
*H04L 101/622* (2022.01)

(56) References Cited

U.S. PATENT DOCUMENTS

2019/0357026 A1* 11/2019 Hwang ............... H04W 64/003
2020/0004269 A1* 1/2020 Oba ........................ G08G 1/22

OTHER PUBLICATIONS

F. Zhang, G. Tan, C. Yu, N. Ding, C. Song and M. Liu, "Fair Transmission Rate Adjustment in Cooperative Vehicle Safety Systems Based on Multi-Agent Model Predictive Control," in IEEE Transactions on Vehicular Technology, vol. 66, No. 7,G, Jul. 31, 2017, pp. 6115-6129.

* cited by examiner

| Network Layer and Transmission Layer | Security-Related Application | Non-Security-Related Applications | |
|---|---|---|---|
| | IEEE1609.3 WSMP | UDP/TCP | IPv6 |
| LLC sublayer | Packet Type Judgment and Distribution | | |
| MAC Sublayer | LTE | IEEE 802.11p | ... |
| PHY layer | PHY | PHY | ... |

VEHICLE RUNNING STATUS FIELD MODEL-BASED INFORMATION TRANSMISSION FREQUENCY OPTIMIZATION METHOD IN INTERNET OF VEHICLES

TECHNICAL FIELD

The present invention belongs to the technical field of network communications, and relates to a vehicle running status field model-based vehicle-to-vehicle information transmission frequency optimization method in the Internet of Vehicles.

BACKGROUND

With the increasing number of vehicles in China, people are no longer satisfied with a single driving process, and the application of Internet of Vehicles is also developing in pluralism. With the continuous improvement of the concept of Vehicle to Everything (V2X), the information interaction between vehicles and vehicles, vehicles and base stations, and vehicles and the Internet is not limited to vehicle status information, but also involves vehicle entertainment and the like, which makes the amount of information greater, as shown in FIG. 1. On the other hand, the existing wireless communication terminals have wide varieties, and the access ports of multiple networks are also different. Common wireless communication technologies in the Internet of Vehicles include DSRC (Dedicated Short Range Communications), Wi-Fi, LTE, WiMAX and even 5G which have respective advantages and disadvantages. As the environment of the Internet of Vehicles becomes more and more complex, and the requirements for the timeliness and robustness of network communications are higher and higher, a single wireless access technology cannot meet the needs of the application of the Internet of Vehicles. The integration of various network interfaces on the terminal equipment of a vehicle and the convergence of heterogeneous networks can improve the transmission performance of the Internet of Vehicles and increase the throughput of the communication network in the Internet of Vehicles so as to improve the experience quality of the driver on the premise of ensuring the driving safety.

The WAVE protocol is currently the most highly recognized dedicated communication protocol standard for the Internet of Vehicles in the world. The research and development of domestic vehicle communication equipment is also based on the WAVE standard. Compared with the traditional TCP/IP protocol, the WAVE protocol adds the IEEE 1609.3 WSMP protocol to the network layer, which is specifically used to process vehicle miming safety-related messages WSM. Such messages have the characteristics of short data message length and high transmission needs. To ensure the transmission quality of WSM, the Internet of Vehicles generally uses a dedicated communication link for transmission, which causes a waste of communication resources to a certain extent.

In related studies, HAZIZA N et al. propose a network interface board specially used in vehicle terminals in the Internet of Vehicles, which integrates three different types of wireless communication interfaces: LTE, IEEE 802.11p and DAB\DMB, and can conduct data transmission by dynamically selecting a link by means of hardware. XU CQ et al. propose a QUVoD architecture, and propose a QXIP module in the IP layer, which integrates two different types of networks: 4G and VANET, and can select an appropriate link for data transmission according to the communication quality parameters of different links. ZHENG K et al. propose a concept of heterogeneous vehicular network (HetVNETs) based on the network function virtualization technology NFV, and adds a heterogeneous link layer (HLL) above the MAC layer to realize the network convergence of the Internet of Vehicles. The above work only adjusts the information transmission frequency based on the network status such as rtt and congestion, but does not take account of the status information of vehicle running scenarios, such as the degree of vehicle running risk. Different scenarios have different requirements for transmission of safety-critical information. WANG J Q et al. put forward an idea of running risk field in the patent CN104239741A, comprehensively consider the vehicle miming factors of people, vehicle, road and the like, construct a running risk field model, and calculate the acting force on the vehicle in the risk field through the intensity of the risk field for safety assistance in the running process. The research is mainly used to provide assistant decision-making for running safety, and does not involve the problem of communication resource optimization.

SUMMARY

The purpose of the present invention is to calculate the current risk intensity of a vehicle through the vehicle running status field model and determine the transmission frequencies of safety-critical information and non-safety-critical information through the magnitude of the risk intensity so as to achieve the function of improving the utilization ratio of link, as shown in FIG. 5. The method mainly uses the Doppler effect and the physical model of the field to model a moving vehicle, and uses the degree of vehicle running risk obtained by the model to control the transmission frequency of safety-critical information so as to obtain the maximum value of the transmission frequency of non-safety-critical messages. When the transmission frequency of non-safety-critical information is greater than the maximum value, the current non-safety-critical message is discarded to ensure the normal transmission of safety-critical messages.

The technical solution of the present invention is as follows:

First, a running status field model in the moving status is established for the vehicle running velocity and the vehicle type according to the Doppler effect theory; second, the degree of risk of the vehicle is calculated based on the model; and finally, the transmission frequency of safety-critical information and the maximum transmission frequency of non-safety-critical information are calculated based on the degree of risk of the vehicle. When the transmission frequency of non-safety-critical information is greater than the maximum transmission frequency, the current non-safety-critical information is discarded.

Step 1. Acquiring data. Acquiring the information of neighbor vehicles in the network at a frequency of 10 Hz per second, including vehicle velocity, vehicle distance and vehicle type.

Step 2. Analyzing the data. Calculating the current degree of risk and the maximum degree of risk of the vehicle by using the running status field model, and judging the current vehicle running status according to the ratio of the current degree of risk to the maximum degree of risk.

Step 3. Automatically adjusting the transmission frequency of safety-critical data according to the degree of risk judged in step 2.

Step 4. Calculating the maximum transmission frequency of non-safety-critical data message according to the frequency in step 3.

Step 5. Selecting a link. Acquiring the packet type, and selecting a link according to the delayed response time RTT and the link load L(T). If the 802.11p link is selected, do step 6; if another link is selected, directly transmitting the data.

Step 6. Calculating the current transmission frequency of non-safety-critical data message, and making a comparison with the maximum transmission frequency of non-safety-critical data message. If the current transmission frequency exceeds the maximum transmission frequency, discarding the message.

The method establishes a running status field model according to the real-time running status of a road vehicle to describe the degree of risk of the vehicle, the degree of risk can be used to dynamically adjust the transmission frequency of safety-critical information, and the transmission frequency of non-safety-critical information is adjusted through the real-time transmission frequency of safety-critical information. The method comprises the following specific steps:

(1) Acquiring real-time road information through the Internet of Vehicles, including vehicle velocity V, vehicle distance r, road width d and vehicle type m;

(2) With the vehicle as objective i as the reference system, establishing a vehicle running status field model: describing the degree of risk of the vehicle according to the Doppler effect and the running status field model, as shown in formula (1);

$$\begin{cases} E_i = \dfrac{K}{K - V\cos\theta} \cdot \dfrac{GM_i}{|r|^2} \\ V = V_i - V_0 \\ M_i = m'_i |V_i|^2 \\ M_0 = m'_0 \cdot |V_i|^2 \\ F_0 = E_i \cdot M_0 \end{cases} \quad (1)$$

wherein K and G are constants; the value of K is the maximum velocity allowed by the road, K=150 km/h, G=1, and $M_i$ is the relative mass of the vehicle as objective i and is related to the vehicle type and the vehicle velocity; and $V_0$ is the velocity of the vehicle as observer 0, $V_i$ is the velocity of the vehicle as objective i, and θ is an included angle between the connection direction of the vehicle as objective i and the vehicle as observer 0 and the movement direction of the vehicle as objective i and is calculated by formula (2);

$$\theta = \begin{cases} \dfrac{\pi}{2} - \arcsin\left|\dfrac{d}{r}\right| & \text{vehicle as observer 0 is in front of vehicle as objective } i \\ \dfrac{\pi}{2} + \arcsin\left|\dfrac{d}{r}\right| & \text{vehicle as observer 0 is behind vehicle as objective } i \end{cases} \quad (2)$$

m is the vehicle type; and formula (3) is obtained after normalization;

$$m'_i = \dfrac{m_i}{m_i + 1} \quad (3)$$

$F_0$ is the degree of risk of the vehicle as observer 0 in the running status field E;

$F_{MAX}$ is defined as the maximum degree of risk of the vehicle as observer:

$$F_{MAX} = \dfrac{K}{K - V} \cdot \dfrac{GM_iM_0}{|s|^2} \quad (4)$$

wherein s is the minimum safe distance for vehicle running and is related to the current velocity of the vehicle;

(3) Calculating the transmission frequency of safety-critical information: calculating the real-time transmission frequency of WSM according to the obtained degree of risk of the vehicle:

$$f_{WSM} = \begin{cases} \left\lfloor \dfrac{F_0}{F_{MAX}} \times 10 \right\rfloor & F_0 \le F_{MAX} \\ 10 & F_0 > F_{MAX} \end{cases} \quad (5)$$

wherein $F_0$ is the risk intensity of the vehicle as observer 0, and $F_{MAX}$ is the maximum risk intensity; and when $F_0 \le F_{MAX}$, the vehicle is in a steady status, the transmission frequency of WSM is automatically adjusted with the ratio of $F_0$ to $F_{MAX}$; when $F_0 > F_{MAX}$, the vehicle is in a risk status, and at this time, the transmission frequency of WSM is the largest;

(4) Calculating the maximum transmission frequency of non-safety-critical information The calculation formula for the number c of non-WSM that can be transmitted by the IEEE 802.11p link in a WSM cycle is $$c = \dfrac{T}{f};$$

wherein T is the current maximum throughput of the link, and f is the transmission frequency of WSM; and by judging whether the remaining space of the send buffer at the MAC layer is larger than C the maximum distribution frequency $f_u$ max of non-safety-critical messages of the IEEE 802.11p link can be obtained as follows:

$$f_{u\,max} = \begin{cases} f \cdot c & L_{MAX} - L(t) \ge c \\ f(L_{MAX} - L(t)) & L_{MAX} - L(t) < c \end{cases} \quad (6)$$

wherein $L_{MAX}$ is the maximum load value of the link, and L(t) is the current load value of the link;

When the distribution frequency of non-WSM of the IEEE 802.11p link reaches $f^{u\,max}$, WSM and non-WSM reach Pareto Optimality, and both obtain the maximum transmission benefit;

(5) Selecting a link: the set of links is N{0,1,2 . . . i}, wherein 0 represents the 802.11p link, and 1-i represent other links; acquiring the data message type, if the type is safety-critical information WSM, directly transmitting the data message by the 802.11p link, and if the type is non-safety-critical information, selecting a transmission link; and selecting a link according to the delayed response time RTT and the link load L(T), and determining whether to transmit on the 802.11p link or a link rather than 802.11p, as shown in formula (7);

$$W_{LS-i} = \begin{cases} \left(\dfrac{RTT}{RTT_{max}} + \dfrac{L(t)}{L_{max} - L_{safe}(t)}\right)_{802.11p} & \text{if } i = 0 \\ \left(\dfrac{RTT}{RTT_{max}} + \dfrac{L(t)}{L_{max}}\right)_i & \text{if } i \neq 0 \end{cases} \quad (7)$$

wherein $W_{LS-0}$ is the selection weight of the 802.11p link, $W_{LS-i}$ is the selection weight of the $i^{th}$ link, $RTT_{max}$ is the maximum allowable delayed response time of the link, and $L_{max}$ is the maximum load of the link; and $L_{safe}$ is the estimated safety-critical information traffic, $i \in N$, and the expression thereof is (8);

$$L_{safe}(t) = f_{WSM} \cdot P \cdot R \quad (8)$$

wherein $f_{WSM}$ is the transmission frequency of safety-critical information obtained in step (3); and P is the number of security applications in the current network, R is the average communication distance between vehicles collected in the current network, and such parameters can be obtained by communications between vehicles and the network;

When the i link exists to let $W_{LS-i} \leq W_{LS-0}$, the i link is selected to transmit the non-safety-critical information message, and if $W_{LS-i} > W_{LS-0}$ for any link i, the 802.11p link is selected to transmit the non-safety-critical information message;

When it is determined that the non-safety-critical information message is transmitted on the 802.11p link, entering step (6); and if the non-safety-critical information message is transmitted on a link rather than 802.11p, transmitting according to the transmission mechanism of the underlying layer of the link; (6) Calculating the distribution frequency of non-safety-critical data message;

If the data message p is distributed to the IEEE 802.11p link, it is required to calculate the maximum distribution frequency $f_{u\ max}$ of non-WSM of the IEEE 802.11p link by formula (6), and then the two latest non-safety-critical messages arriving on the IEEE 802.11p link are used to calculate the instantaneous distribution frequency $f_u$ of non-safety-critical information on the IEEE 802.11p link at this time;

$$f_u = \dfrac{1}{t_2 - t_1} \quad (9)$$

wherein $t_1$, $t_2$ are the arrival time of two adjacent non-safety-critical information messages on the link; when $f_u \leq f_{u\ max}$ the non-safety-critical message can be transmitted in the 802.11p link, and when $f_u > f_{u\ max}$ the non-safety-critical information message is discarded to ensure the normal transmission of safety-critical messages.

The present invention has the following effects and benefits: one is that the present invention establishes the vehicle running status field model, uses the risk intensity of the vehicle in the running status field to describe the current running risk of the vehicle, and takes account of different application scenarios, thereby having generality; and the other is that the improved network resource optimization method can effectively improve the communication efficiency of heterogeneous networks, and dynamically adjust the transmission frequency of safety-critical information through the magnitude of the risk intensity to improve the utilization ratio of link.

In the figure, 1 is a base station (road side unit), 2 is a transport facility, and 3 is a vehicle.

Figure 1:
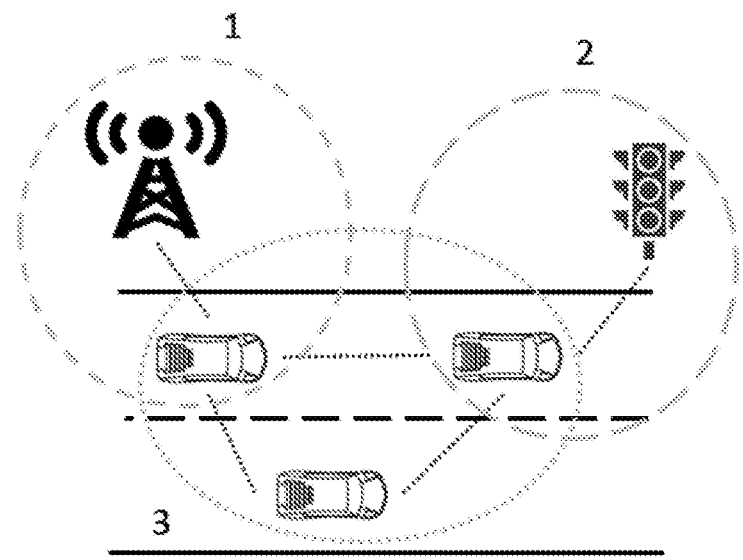
FIG. 1 is a schematic diagram of Vehicle to Everything (V2X) in the Internet of Vehicles.
Figure 2:
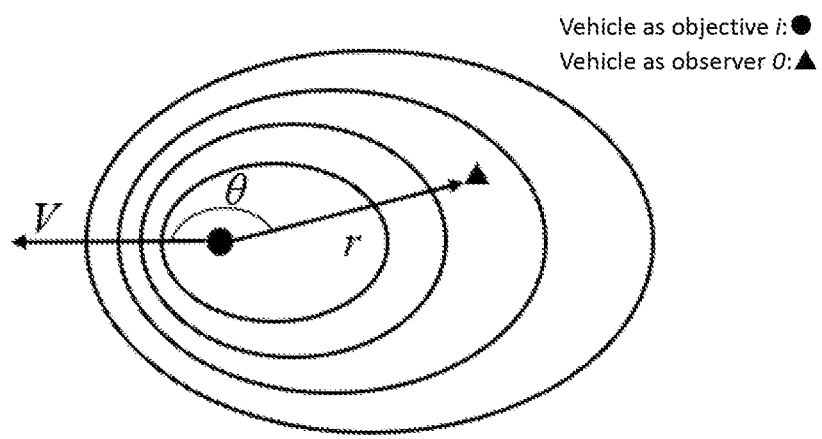

FIG. 2 is a schematic diagram of degree of risk distribution of a moving vehicle i.

Figures 3, 4:
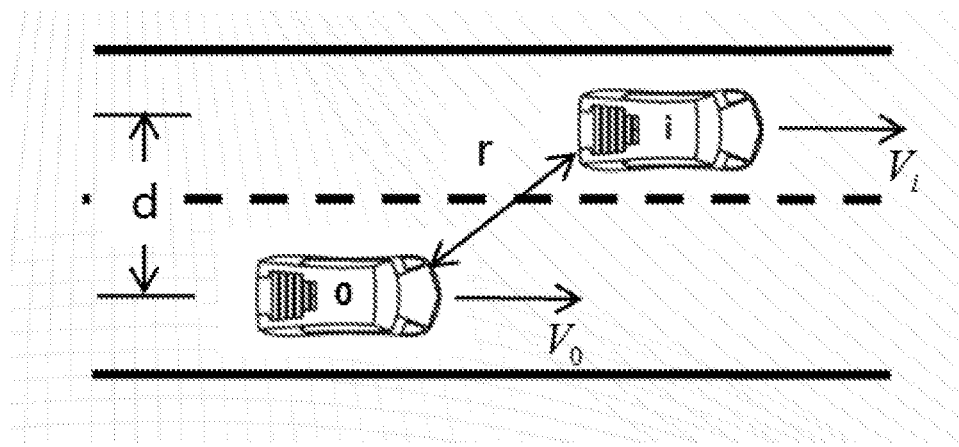

FIG. 3 is a schematic diagram of a traffic scenario for vehicle running.

FIG. 4 is a schematic diagram of an MAC sublayer of an LLC layer.

Figure 5:
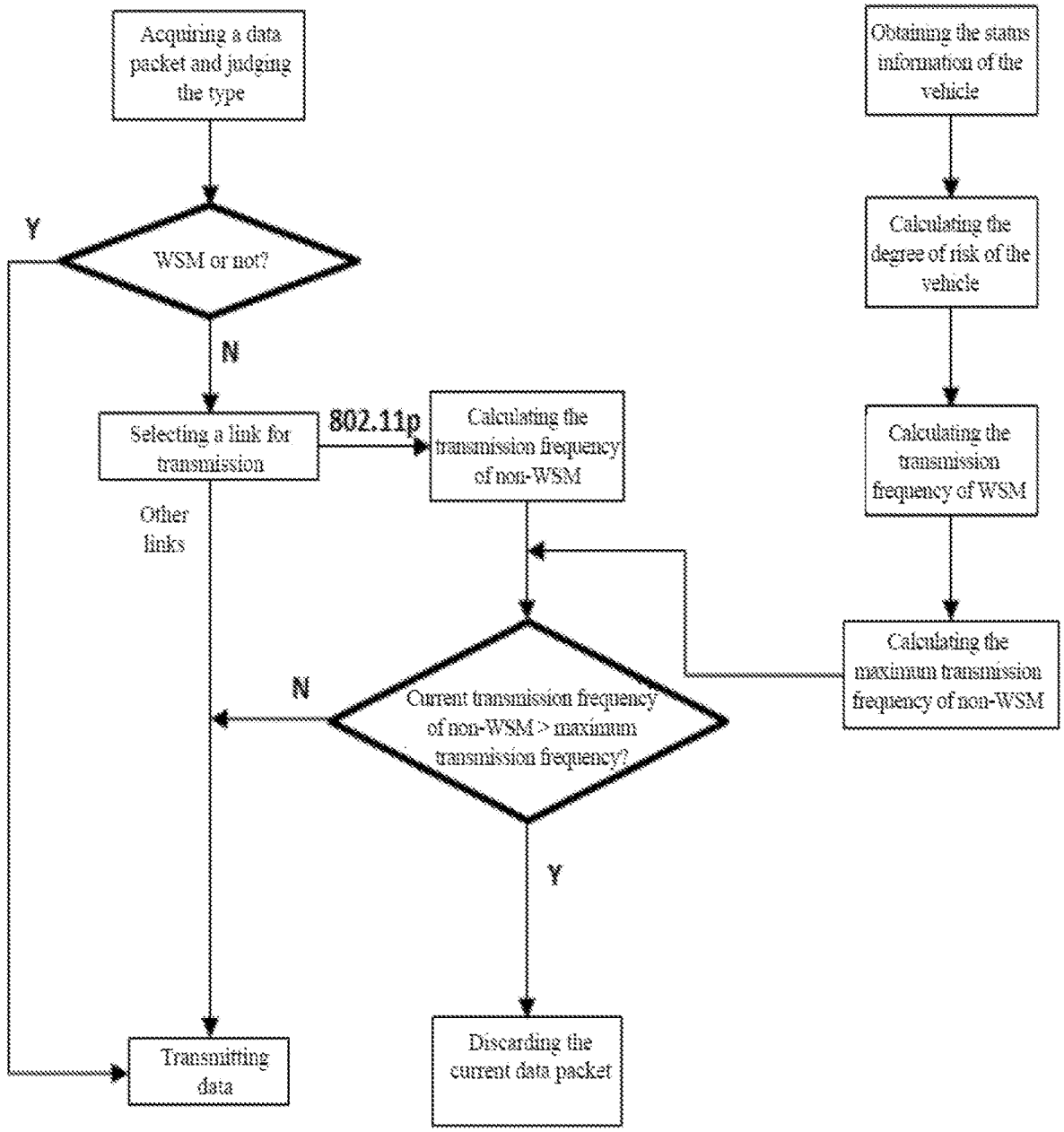

FIG. 5 is a flow chart of a vehicle running status field model-based information transmission frequency optimization method.

DETAILED DESCRIPTION

Detailed description of the present invention is described below in combination with accompanying drawings.

Step 1. Acquiring Data

Acquiring the information of the road and neighbor vehicles in the network at a frequency of 10 Hz per second, including vehicle velocity V vehicle distance r, road width d and vehicle type m.

Step 2. Establishing a Vehicle Running Status Field Model

With the vehicle as objective i as the reference system, establishing a vehicle running status field model. Calculating the relative velocity of the surrounding vehicles. Mutual influence exists between vehicles and vehicles and between vehicles and objects, the effect thereof can be equivalently regarded as a "physical field" which is similar to a charge field, vehicles and objects can be equivalently regarded as electric charges, and each electric charge is influenced by other electric charges.

The charge field is used to describe the vehicle running status field. Objects on the road generally include vehicles, obstacles and pedestrians. The size of the running status field depends on the types and velocities of the objects. When an object is in motion, the distribution of the running status field formed thereby is different from that in a static status. From the practical experience, the degree of risk in front of a moving object is higher than the degree of risk behind, as shown in FIG. 2, which is similar to the Doppler effect. The Doppler effect refers to the change in the wavelength of a wave radiated by an object due to the relative movement of the wave source and the mover. In front of a moving wave source, the wavelength becomes shorter and the frequency becomes higher; and behind the moving wave source, the wavelength becomes longer and the frequency becomes lower.

The vehicle running status field model is related to the vehicle type, the vehicle velocity and the vehicle distance. Such information can be obtained in real time through real-time communication between the vehicle and the road side unit or other vehicles.

The degree of risk of the vehicle is described according to the Doppler effect and the running status field model, as shown in formula (1).

$$\begin{cases} E_i = \dfrac{K}{K - V\cos\theta} \cdot \dfrac{GM_i}{|r|^2} \\ V = V_i - V_0 \\ M_i = m'_i |V_i|^2 \\ M_0 = m'_0 \cdot |V_i|^2 \\ F_0 = E_i \cdot M_0 \end{cases} \quad (1)$$

wherein K and G are constants. The value of K is the maximum velocity allowed by the road, generally, K=150 km/h, G=1, and $M_i$ is the relative mass of the vehicle as objective i and is related to the vehicle type and the vehicle velocity. $V_0$ is the velocity of the vehicle as observer 0, $V_i$ is the velocity of the vehicle as objective i, and θ is an included angle between the connection direction of the vehicle as objective i and the vehicle as observer 0 and the movement direction of the vehicle as objective i and is calculated by formula (2).

$$\theta = \begin{cases} \frac{\pi}{2} - \arcsin\left|\frac{d}{r}\right| & \text{vehicle as observer 0 is in front of vehicle as objective } i \\ \frac{\pi}{2} + \arcsin\left|\frac{d}{r}\right| & \text{vehicle as observer 0 is behind vehicle as objective } i \end{cases} \quad (2)$$

m is the vehicle type; and according to the actual situation, the moving objects on the road are divided into 6 types: 1: obstacle, 2: pedestrian, 3: non-motorized vehicle, 4: small vehicle, 5: medium vehicle, and 6: large vehicle. Formula (3) is obtained after normalization.

$$m_i' = \frac{m_i}{m_i + 1} \quad (3)$$

$F_0$ is the degree of risk of the vehicle as observer 0 in the running status field E.

$F_{MAX}$ is defined as the maximum degree of risk of the vehicle as observer:

$$F_{MAX} = \frac{K}{K-V} \cdot \frac{GM_iM_0}{|s|^2} \quad (4)$$

wherein s is the minimum safe distance for vehicle running and is related to the current velocity of the vehicle, and the acquisition method is shown in Table 1 below.

TABLE 1

Relationship between Safe Distance and Running Velocity

| Running Nature | Condition | Safe Distance |
|---|---|---|
| High-Speed Running | V > 100 km/h | s ≥ m |
| Fast Running | 70 km/h < V ≤ 100 km/h | s ≥ V |
| Medium-Speed Running | 40 km/h < V ≤ 70 km/h | s ≥ 60 m |
| Low-Speed Running | 20 km/h < V ≤ 40 km/h | s ≥ 30 m |
| Slow Running | V ≤ 20 km/h | s ≥ 10 m |

Information distribution mechanism: In the environment of the Internet of Vehicles, according to the degree of urgency of data, data messages are mainly divided into two types: safety-critical information (WSM) and non-safety-critical information, as shown in FIG. 3. To ensure the transfer efficiency of WSM and meet the transfer needs of security applications, in the process of transmitting the data messages from the LLC layer to the MAC layer, the transmission frequency of non-safety-critical message shall be limited, but in the multi-MAC and multi-link Internet of Vehicles, the distribution frequency of non-safety-critical message from the LLC layer to the IEEE 802.11p link is the largest.

Step 3. Calculating the Transmission Frequency of Safety-Critical Information

The current status message broadcast frequency specified by the Internet of Vehicles communication protocol standard is 1 Hz-10 Hz. The higher the frequency is, the more frequent the safety-critical message exchange of vehicles is, and the safer the environment in which vehicles move is, but more channel resources will be occupied. When the actual traffic situation is not particularly complex, the idle safety-critical information channel resources can be transferred to non-safety-critical information for transmission, thereby improving the utilization ratio of channel. The technical solution is as follows:

Calculating the real-time transmission frequency of WSM according to the degree of risk of the vehicle obtained above:

$$f_{WSM} = \begin{cases} \left\lfloor \frac{F_0}{F_{MAX}} \times 10 \right\rfloor & F_0 \leq F_{MAX} \\ 10 & F_0 > F_{MAX} \end{cases} \quad (5)$$

wherein $F_0$ is the risk intensity of the vehicle as observer 0, and $F_{MAX}$ is the maximum risk intensity. When $F_0 \leq F_{MAX}$, the vehicle is in a steady status, the transmission frequency of WSM is automatically adjusted with the ratio of $F_0$ to $F_{MAX}$; when $F_0 > F_{MAX}$, the vehicle is in a risk status, and at this time, the transmission frequency of WSM is the largest.

Step 4. Calculating the Maximum Transmission Frequency of Non-Safety-Critical Information In the process of data distribution, WSM and non-WSM are in a competitive relationship, but in the environment of the Internet of Vehicles, the benefit of WSM shall be guaranteed first. Therefore, on the premise that the benefits of WSM are not impaired, the benefit of non-WSM shall be maximized, the result obtained is Pareto Optimality, and the maximum distribution frequency of non-WSM currently adopted is the Pareto optimal solution.

The calculation formula for the number c of non-WSM that can be transmitted by the IEEE 802.11p link in a WSM cycle is $$c = \frac{T}{f}.$$

wherein T is the current maximum throughput of the link, and f is the transmission frequency of WSM.

In an ideal status, after a non-safety-critical message with a size of c is transmitted, the next safety-critical message can be transmitted directly without waiting, which will not affect the transmission requirements of safety-critical messages. Therefore, in actual conditions, by judging whether the remaining space of the send buffer at the MAC layer is larger than C the maximum distribution frequency $f_{u\ max}$ of non-safety-critical messages of the IEEE 802.11p link can be obtained as follows:

$$f_{u\,max} = \begin{cases} f \cdot c & L_{MAX} - L(t) \geq c \\ f(L_{MAX} - L(t)) & L_{MAX} - L(t) < c \end{cases} \quad (6)$$

wherein $L_{MAX}$ is the maximum load value of the link, and L(t) is the current load value of the link.

When the distribution frequency of non-WSM of the IEEE 802.11p link reaches $f_{u\ max}$, WSM and non-WSM reach Pareto Optimality, and both obtain the maximum transmission benefit.

Step 5. Selecting a link

The set of links is N{0,1,2 ... i}, wherein 0 represents the 802.11p link, and 1-i represent other links. Acquiring the data message type, if the type is safety-critical information (WSM), directly transmitting the data message by the 802.11p link, and if the type is non-safety-critical information, selecting a transmission link. Selecting a link according to the delayed response time RTT and the link load L(T), and determining whether to transmit on the 802.11p link or a link rather than 802.11p, as shown in formula (7).

$$W_{LS-i} = \begin{cases} \left(\frac{RTT}{RTT_{max}} + \frac{L(t)}{L_{max} - L_{safe}(t)}\right)_{802.11p} & \text{if } i = 0 \\ \left(\frac{RTT}{RTT_{max}} + \frac{L(t)}{L_{max}}\right)_i & \text{if } i \neq 0 \end{cases} \quad (7)$$

wherein $W_{LS-0}$ is the selection weight of the 802.11p link, $W_{LS-i}$ is the selection weight of the $i^{th}$ link, $RTT_{max}$ is the maximum allowable delayed response time of the link, and $L_{max}$ is the maximum load of the link. $L_{safe}$ is the estimated safety-critical information traffic, i∈N, and the expression thereof is (8).

$$L_{safe}(t) = f_{WSM} \cdot P \cdot R \quad (8)$$

wherein $f_{WSM}$ is the transmission frequency of safety-critical information obtained in step 3. P is the number of security applications in the current network, R is the average communication distance between vehicles collected in the current network, and such parameters can be obtained by communications between vehicles and the network.

When the i link exists to let $W_{LS-i} \leq W_{LS-0}$, the i link is selected to transmit the non-safety-critical information message, and if $W_{LS-i} > W_{LS-0}$ for any link i, the 802.11p link is selected to transmit the non-safety-critical information message.

When it is determined that the non-safety-critical information message is transmitted on the 802.11p link, entering step 6. If the non-safety-critical information message is transmitted on a link rather than 802.11p, transmitting according to the transmission mechanism of the underlying layer of the link. For example, congestion waiting and the like are handled according to the original link strategy. The present invention is not excessively limited in this portion.

Step 6. Calculating the Distribution Frequency of Non-Safety-Critical Data Message.

After the above two steps, if the data message p is distributed to the IEEE 802.11p link, it is required to calculate the maximum distribution frequency $f_{u\ max}$ of non-WSM of the IEEE 802.11p link by (6), and then the two latest non-safety-critical messages arriving on the IEEE 802.11p link are used to calculate the instantaneous distribution frequency $f_u$ of non-safety-critical information on the IEEE 802.11p link at this time.

$$f_u = \frac{1}{t_2 - t_1} \quad (9)$$

wherein $t_1$, $t_2$, are the arrival time of two adjacent non-safety-critical information messages on the link; when $f_u \leq f_{u\ max}$, the non-safety-critical message can be transmitted in the 802.11p link, and when $f_u > f_{u\ max}$, the non-safety-critical information message is discarded to ensure the normal transmission of safety-critical messages.

The invention claimed is:

1. A vehicle running status field model-based information transmission frequency optimization method in the Internet of Vehicles, wherein a running status field model is established according to the real-time running status of a road vehicle to describe the degree of risk of the vehicle, the degree of risk is used to dynamically adjust the transmission frequency of safety-critical information, and the transmission frequency of non-safety-critical information is adjusted through the real-time transmission frequency of safety-critical information; and the method comprises the following steps:

(1) acquiring real-time road information through the Internet of Vehicles, including vehicle velocity V, vehicle distance r, road width d and vehicle type m;

(2) with the vehicle as objective i as the reference system, establishing a vehicle running status field model: describing the degree of risk of the vehicle according to the Doppler effect and the running status field model, as shown in formula (1);

$$\begin{cases} E_i = \frac{K}{K - V\cos\theta} \cdot \frac{GM_i}{|r|^2} \\ V = V_i - V_0 \\ M_i = m_i' \cdot |V_i|^2 \\ M_0 = m_0' \cdot |V_0|^2 \\ F_0 = E_i \cdot M_0 \end{cases} \quad (1)$$

wherein K and G are constants; the value of K is the maximum velocity allowed by the road, K=150 km/h, G=1, and $M_i$ is the relative mass of the vehicle as objective i and is related to the vehicle type and the vehicle velocity; and $V_0$ is the velocity of the vehicle as observer 0, $V_i$ is the velocity of the vehicle as objective i, and θ is an included angle between the connection direction of the vehicle as objective i and the vehicle as observer 0 and the movement direction of the vehicle as objective i and is calculated by formula (2);

$$\theta = \begin{cases} \frac{\pi}{2} - \arcsin\left|\frac{d}{r}\right| & \text{vehicle as observer 0 is in front of vehicle as objective } i \\ \frac{\pi}{2} + \arcsin\left|\frac{d}{r}\right| & \text{vehicle as observer 0 is behind vehicle as objective } i \end{cases}$$

m is the vehicle type; and formula (3) is obtained after normalization;

$$m_i' = \frac{m_i}{m_i + 1} \quad (3)$$

$F_0$ is the degree of risk of the vehicle as observer 0 in the running status field E;

$F_{MAX}$ is defined as the maximum degree of risk of the vehicle as observer:

$$F_{MAX} = \frac{K}{K - V} \cdot \frac{GM_i M_0}{|s|^2} \quad (4)$$

wherein s is the minimum safe distance for vehicle running and is related to the current velocity of the vehicle;

(3) calculating the transmission frequency of safety-critical information: calculating the real-time transmission frequency of WSM according to the obtained degree of risk of the vehicle:

$$f_{WSM} = \begin{cases} \left\lfloor \dfrac{F_0}{F_{MAX}} \times 10 \right\rfloor & F_0 \le F_{MAX} \\ 10 & F_0 > F_{MAX} \end{cases} \quad (5)$$

wherein $F_0$ is the risk intensity of the vehicle as observer 0, and $F_{MAX}$ is the maximum risk intensity; and when $F_0 \le F_{MAX}$, the vehicle is in a steady status, the transmission frequency of WSM is automatically adjusted with the ratio of $F_0$ to $F_{MAX}$; when $F_0 > F_{MAX}$, the vehicle is in a risk status, and at this time, the transmission frequency of WSM is the largest;

(4) calculating the maximum transmission frequency of non-safety-critical information the calculation formula for the number c of non-WSM that can be transmitted by the IEEE 802.11p link in a WSM cycle is $$c = \dfrac{T}{f};$$

wherein T is the current maximum throughput of the link, and f is the transmission frequency of WSM; and by judging whether the remaining space of the send buffer at the MAC layer is larger than c, the maximum distribution frequency $f_{u\ max}$ of non-safety-critical messages of the IEEE 802.11p link is obtained as follows:

$$f_{u\,max} = \begin{cases} f \cdot c & L_{MAX} - L(t) \ge c \\ f(L_{MAX} - L(t)) & L_{MAX} - L(t) < c \end{cases} \quad (6)$$

wherein $L_{MAX}$ is the maximum load value of the link, and L(t) is the current load value of the link; when the distribution frequency of non-WSM of the IEEE 802.11p link reaches $f_{u\ max}$, WSM and non-WSM reach Pareto Optimality, and both obtain the maximum transmission benefit;

(5) selecting a link: the set of links is N{0,1,2 . . . i}, wherein 0 represents the 802.11p link, and 1-i represent other links; acquiring the data message type, if the type is safety-critical information WSM, directly transmitting the data message by the 802.11p link, and if the type is non-safety-critical information, selecting a transmission link; and selecting a link according to the delayed response time RTT and the link load L(T), and determining whether to transmit on the 802.11p link or a link rather than 802.11p, as shown in formula (7);

$$W_{LS-i} = \begin{cases} \left( \dfrac{RTT}{RTT_{max}} + \dfrac{L(t)}{L_{max} - L_{safe}(t)} \right)_{802.11p} & \text{if } i = 0 \\ \left( \dfrac{RTT}{RTT_{max}} + \dfrac{L(t)}{L_{max}} \right)_i & \text{if } i \ne 0 \end{cases} \quad (7)$$

wherein $W_{LS-0}$ is the selection weight of the 802.11p link, $W_{LS-i}$ is the selection weight of the $i^{th}$ link, $RTT_{max}$ is the maximum allowable delayed response time of the link, and $L_{max}$ is the maximum load of the link; and $L_{safe}$ is the estimated safety-critical information traffic, $i \in N$, and the expression thereof is (8);

$$L_{safe}(t) = f_{WSM} \cdot P \cdot R \quad (8)$$

wherein $f_{WSM}$ is the transmission frequency of safety-critical information obtained in step (3); and P is the number of security applications in the current network, R is the average communication distance between vehicles collected in the current network, and such parameters are obtained by communications between vehicles and the network;

when the i link exists to let $W_{LS-i} \le W_{LS-0}$, the i link is selected to transmit the non-safety-critical information message, and if $W_{LS-i} > W_{LS-0}$ for any link i, the 802.11p link is selected to transmit the non-safety-critical information message;

when it is determined that the non-safety-critical information message is transmitted on the 802.11p link, entering step (6); and if the non-safety-critical information message is transmitted on a link rather than 802.11p, transmitting according to the transmission mechanism of the underlying layer of the link;

(6) calculating the distribution frequency of non-safety-critical data message;

If the data message p is distributed to the IEEE 802.11p link, it is required to calculate the maximum distribution frequency $f_{u\ max}$ of non-WSM of the IEEE 802.11p link by formula (6), and then the two latest non-safety-critical messages arriving on the IEEE 802.11p link are used to calculate the instantaneous distribution frequency $f_u$ of non-safety-critical information on the IEEE 802.11p link at this time;

$$f_u = \dfrac{1}{t_2 - t_1} \quad (9)$$

wherein $t_1$, $t_2$ are the arrival time of two adjacent non-safety-critical information messages on the link; when $f_u \le f_{u\ max}$, the non-safety-critical message is transmitted in the 802.11p link, and when $f_u > f_{u\ max}$, the non-safety-critical message is discarded to ensure the normal transmission of safety-critical messages.

* * * * *